US005626957A

United States Patent [19]

Benso et al.

[11] Patent Number: 5,626,957

[45] Date of Patent: May 6, 1997

[54] ANTISTATIC X-RAY INTENSIFYING SCREEN COMPRISING SULFONYL METHIDE AND SULFONYL IMIDE AND AMIDE SALTS

[75] Inventors: Paolo Benso, Savona; Dario Ballerini, Genova, both of Italy; William M. Lamanna, Stillwater; George G. I. Moore, Afton, both of Minn.; William A. Huffman, Pittsford, N.Y.

[73] Assignee: Minnesota Mining and Manufacturing Company, St. Paul, Minn.

[21] Appl. No.: 491,116

[22] Filed: Jun. 16, 1995

[30] Foreign Application Priority Data

Jul. 12, 1994 [EP] European Pat. Off. ............ 941108029

[51] Int. Cl.$^6$ ............................ B32B 5/16; B32B 19/00

[52] U.S. Cl. ........................ 428/323; 428/341; 428/543; 428/691; 428/917

[58] Field of Search ................................ 428/341, 543, 428/690, 691, 917, 323; 252/478; 364/132, 413.23; 524/910, 911, 912, 913; 361/466, 467, 543

[56] References Cited

U.S. PATENT DOCUMENTS

| | | | |
|---|---|---|---|
| 3,609,187 | 9/1971 | Moore et al. | 564/96 |
| 4,164,412 | 8/1979 | Moore et al. | 504/333 |
| 4,257,970 | 3/1981 | Tomalia | 564/91 |
| 4,477,564 | 10/1984 | Cellone et al. | 430/567 |
| 4,505,997 | 3/1985 | Armand et al. | 429/192 |
| 4,666,774 | 5/1987 | Christini | 428/330 |
| 4,668,614 | 5/1987 | Takada et al. | 430/567 |
| 4,711,827 | 12/1987 | Christini | 428/690 |
| 4,728,602 | 3/1988 | Shibahara et al. | 430/567 |
| 5,072,040 | 12/1991 | Armand | 564/82 |

*Primary Examiner*—Hoa T. Le

*Attorney, Agent, or Firm*—Gary L. Griswold; Walter N. Kirn; Mark A. Litman

[57] ABSTRACT

The present invention relates to an X-ray intensifying screen comprising a support, a fluorescent layer coated thereon which comprises fluorescent phosphor particles dispersed in a binder, and a protective top-coat layer covering said fluorescent layer, characterized in that at least one of said fluorescent and top-coat layers comprises at least one salt selected from the group consisting of fluoroalkylsulfonyl methides, fluoroalkylsulfonyl imides, and fluoroalkylsulfonyl amides.

8 Claims, No Drawings

ANTISTATIC X-RAY INTENSIFYING SCREEN COMPRISING SULFONYL METHIDE AND SULFONYL IMIDE AND AMIDE SALTS

FIELD OF THE INVENTION

The present invention relates to novel radiographic intensifying screens having improved antistatic properties, more particularly to radiographic intensifying screens comprising highly fluorinated alkylsulfonyl methide, imide, and amide salts.

BACKGROUND OF THE ART

It is known in the art of medical radiography to employ intensifying screens to reduce the X-ray dosage to the patient. Intensifying screens absorb the X-ray radiations and emit electromagnetic radiations which can be better absorbed by silver halide emulsion layers. Another approach to reduce the X-ray dosage to the patient is to coat two silver halide emulsion layers on the opposite sides of a support to form a duplitized radiographic element.

Accordingly, it is a common practice in medical radiography to use a radiographic assembly consisting of a duplitized radiographic element interposed between a pair of front and back screens.

The typical structure of an intensifying screen comprises a support and a phosphor layer coated thereon. The phosphor layer comprises a fluorescent substance able to emit light when exposed to X-ray and a binder. Additionally, a primer layer is sometimes provided between the fluorescent layer and the substrate to assist in bonding the fluorescent layer to the substrate, and a reflective layer is sometimes provided between the substrate (or the primer) and the fluorescent layer. Finally, a protective layer for physically and chemically protecting the screen is usually provided on the surface of the fluorescent layer.

Typically, polymer materials, such as polyethylene terephthalate, or paper are used as support for the intensifying screen. Intensifying screens obtained from such supports easily can be electrostatically charged on its surface due to repeated physical contacts with other surfaces of different materials during their use. This static electrification can promote some adverse effects in practical operations of radiation image recording and reproducing.

For example, when the surface of an intensifying screen is charged, it may adhere to another screen or to a radiographic film coupled with it during the exposure of the patient to X-rays. The resulting image provided by the film can suffer of static marks when discharge of the panel takes place. The static marks are produced in the form of overexposed portions on the radiographic film in contact with the intensifying screen, corresponding to areas in which discharge of the static electricity takes place. Static marks appearing on radiographic films are disadvantageous, in particular in medical radiography for diagnosis, where static marks cause problems in the analysis of the resulting photographic image.

A number of patents and patent applications have been issued on this problem, offering a number of solutions.

JP 03/255,400 discloses an intensifying screen comprising a protective layer of fine particles of metal oxides dispersed in a binder.

JP 03/252,599 discloses an intensifying screen comprising a protective layer consisting of an N-heterocycle compound dispersed in cellulose acetate.

JP 03/237,399 discloses an intensifying screen comprising an intermediate conducting layer between the support and the fluorescent layer consisting of carbon black and/or metals dispersed in a binder.

EP 223,062 discloses an intensifying screen comprising a intermediate or back layer comprising metal oxides, carbon black, or conductive organic compounds.

U.S. Pat. No. 5,151,604 discloses an intensifying screen comprising a subbing layer interposed between the support and a fluorescent layer comprising conductive ZnO whiskers having average diameters of 0.3 to 3.0 mm and average lengths of 3 to 150 mm.

U.S. Pat. No. 4,943,727 discloses an intensifying screen comprising a protective layer having on one or both surfaces thereof a metallic film obtained by evaporating a metal compound selected among Ni, Cr, Au, Sn, Al, Cu, and Zn.

U.S. Pat. No. 4,711,827 discloses an intensifying screen comprising an acrylo-nitrile/styrene copolymer composition as protective top-coat.

U.S. Pat. No. 4,666,774 discloses an intensifying screen with a protective layer of a fluorinated polymer comprising an antistatic agent selected from the group of alkylphosphate mixtures, quaternized fatty imidazine derivatives, and ethoxylated amines.

U.S. Pat. No. 4,983,848 discloses an intensifying screen having a top-coat layer consisting of polyamide derivatives, such as, nylon 6,6, nylon 6, amorphous nylon and the like.

U.S. Pat. No. 4,855,191 discloses an intensifying screen with an antistatic layer comprising a conductive polymer layer, such as acrylic resins or polysiloxanes.

EP 377,470 discloses an intensifying screen comprising an antistatic topcoat layer having inorganic salts dispersed in a binder. Preferred inorganic salts are, for example, LiCl, NaCl, NaBr, $NaNO_3$, $Na_3PO_4$, CsI, $MgBr_2$, $BaBr_2$, $BaI_2$, $AlBr_3$.

In spite of this activity to solve the long-standing problem of static marks, a definitive solution is still to be reached. It is an object of the present invention to contribute to the reduction of static marks on photographic films, particularly those intended to be used in medical radiography.

SUMMARY OF THE INVENTION

The present invention relates to an X-ray intensifying screen comprising a support, a fluorescent layer coated thereon which comprises fluorescent phosphor particles dispersed in a binder, and a protective top-coat layer covering said fluorescent layer, characterized in that at least one of said fluorescent and top-coat layers comprises at least one salt selected from the group consisting of fluoroalkylsulfonyl methides, fluoroalkylsulfonyl imides, and fluoroalkylsulfonyl amides.

DETAILED DESCRIPTION OF THE INVENTION

Accordingly, the present invention relates to an X-ray intensifying screen comprising a support, a fluorescent layer coated thereon which comprises fluorescent phosphor particles dispersed in a binder, and a protective top-coat layer covering said fluorescent layer, characterized in that at least one of said fluorescent and top-coat layers comprises at least one salt selected from the group consisting of fluoroalkylsulfonyl methides, fluoroalkylsulfonyl imides, and fluoroalkylsulfonyl amides.

The salts of fluoroalkylsulfonyl methides (bearing at least one fluoroalkylsulfonyl group), imides, and amides useful in the intensifying screen of the present invention can be represented by the following formula:

$$[Rf-SO_2]_{v-m-1}X^-[Y-R]_m \quad Me^+$$

wherein Me is an organic or inorganic cation, Rf is a highly fluorinated alkyl group having 1 to 12 carbon atoms, X is nitrogen or carbon atom, Y is —C(O)—, —SO2— or a single bond, R is an alkyl or aryl group, v is the valence of X, and m is 0 or 1, when X is nitrogen atom, and m is 0 or 1 or 2 when X is carbon atom, and wherein two Rf groups can join together to form a ring.

The R group preferably comprises electron withdrawing substituents (e.g., halogen atoms, cyano group, nitro group, or fluoroalkyl group).

The term "highly fluorinated alkyl group" means an alkyl group in which at least two hydrogen atoms on each carbon atom in the alkyl chain are substituted with fluorine. Preferably, at least 80% of the hydrogen atoms are replaced by fluorine, more preferably at least 90% of the hydrogen atoms are replaced by fluorine, and most preferably all the hydrogen atoms are replaced by fluorine.

Preferably, Me is an alkali metal (e.g., Li, K, and Na), an alkaline-earth metal (e.g., Ca, Mg, and Sr), or a nitrogen onium.

According to the scope of the present invention, when the term "group" is used to describe a chemical compound or substituent, the described chemical material includes the basic group and that group with conventional substitution. Where the term "moiety" is used to describe a chemical compound or substituent only an unsubstituted chemical material is intended to be included.

According to a preferred aspect of the present invention, the salt is a lithium salt of fluoroalkylsulfonyl imides or a lithium salt of bis- or tris-fluoroalkylsulfonyl methides.

According to a more preferred embodiment of the present invention, lithium salts of a fluoroalkylsulfonyl imides or fluoroalkylsulfonyl methides useful in the intensifying screen of the present invention can be represented by the following formula:

$$[Rf-SO_2]_{v-1}X^- \quad Li^+$$

wherein Rf is a highly fluorinated alkyl group having 1 to 8 carbon atoms, X is nitrogen or carbon atom, and v is the X valence (4 for carbon atom and 3 for nitrogen atom), and wherein two Rf groups can join together to form a ring.

A description of the above mentioned compounds and their synthesis, incorporated herein by reference can be found in U.S. Pat. No. 4,505,997, U.S. Pat. No. 5,021,308, U.S. Pat. No. 5,072,040, U.S. Pat. No. 5,162,177 and U.S. Pat. No. 5,273,840. Examples of preferred lithium salts of fluoroalkylsulfonyl imides and fluoroalkylsulfonyl methides are illustrated below, However, the present invention is not intended to be limited by the following examples.

$CF_3-SO_2-N^--SO_2-CF_3 \quad Li^+$

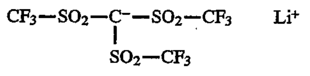

$C_2F_5-SO_2-N^--SO_2-CF_3 \quad Li^+$

-continued

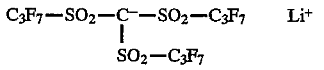

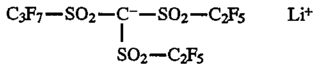

$C_3F_7-SO_2-N^--SO_2-C_3F_7 \quad Li^+$ $C_5F_{11}-SO_2-N^--SO_2-C_6F_{13} \quad Li^+$

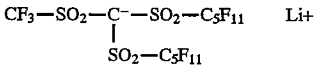

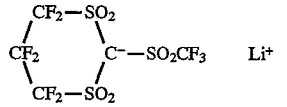

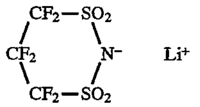

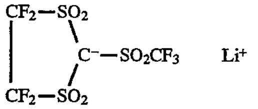

Advantages of salts of the present invention include high solubility in aqueous and organic media, high ionic conductivity, high chemical and thermal stability and their compatibility with other chemical components present in the X-ray intensifying screen.

The salts of fluoroalkylsulfonyl imides, fluoroalkylsulfonyl amides or fluoroalkylsulfonyl methides are employed at a coating weight of from 0.01 to 20 g/m$^2$, preferably from 0.05 to 10 g/m$^2$, more preferably from 0.1 to 5 g/m$^2$. The salts can be added to the fluorescent layer, to the protective top-coat layer or both. When the salts are added to both the fluorescent and protective top-coat layers, it is preferred that the ratio of salt coating weight in the fluorescent and top-coat layer is from 10:1 to 1:10, preferably from 6:1 to 1:6.

The intensifying screen of this invention comprises a fluorescent layer comprising a binder and at least one phosphor dispersed therein. The fluorescent layer is formed by dispersing the phosphor(s) in an organic solvent solution of the binder to prepare a coating dispersion having the desired phosphor to binder weight ratio, and then applying the coating dispersion by a conventional coating method to form a uniform layer. Although the fluorescent layer itself can be an intensifying screen when the fluorescent layer is self-supporting, the fluorescent layer is generally provided on a substrate to form an intensifying screen.

A protective layer for physically and chemically protecting the fluorescent layer is usually provided on the surface of the fluorescent layer. Additionally, a primer layer is sometimes provided on the substrate to improve the bond between the fluorescent layer and the substrate, and a reflective layer is sometimes provided between the substrate (or the primer) and the fluorescent layer.

The phosphors used in the intensifying screen of the present invention have an emission maximum wavelength in the ultraviolet, blue, green, red or infrared region of the electromagnetic spectrum. More preferably, the phosphors emit radiations in the ultraviolet, blue and green regions of the electromagnetic spectrum.

The green emitting phosphors should emit radiation having more than about 80% of its spectral emission above 480 nm and its maximum of emission in the wavelength range of 530–570 nm. Green emitting phosphors which may be used in the intensifying screen of the present invention include rare earth activated rare earth oxysulfide phosphors of at least one rare earth element selected from yttrium, lanthanum, gadolinium and lutetium, rare earth activated rare earth oxyhalide phosphors of the same rare earth elements, a phosphor composed of a borate of the above rare earth elements, a phosphor composed of a phosphate of the above rare earth elements and a phosphor composed of tantalate of the above rare earth elements. These rare earth green emitting phosphors have been extensively described in the patent literature, for example in U.S. Pat. Nos. 4,225,653, 3,418,246, 3,418,247, 3,725,704, 3,617,743, 3,974,389, 3,591,516, 3,607,770, 3,666,676, 3,795,814, 4,405,691, 4,311,487 and 4,387,141. These rare earth phosphors have a high X-ray absorbing power and high efficiency of light emission when excited with X-ray radiation and enable radiologists to use substantially lower X-ray radiation dosage levels. Particularly suitable phosphors for use in the intensifying screen of the present invention are terbium or terbium-thulium activated rare earth oxysulfide phosphors represented by the following general formula:

$$(Ln_{1-a-b}, Tb_a, Tm_b)_2O_2S$$

wherein Ln is at least one rare earth element selected from lanthanum, gadolinium and lutetium, and a and b are numbers meeting the conditions $0.0005 \leqq a \leqq 0.09$ and $0 \leqq b \leqq 0.01$, respectively, and terbium or terbium-thulium activated rare earth oxysulfide phosphors represented by the following general formula:

$$(Y_{1-c-a-b}, Ln_c, Tb_a, Tm_b)_2O_2S$$

wherein Ln is at least one rare earth element selected from lanthanum, gadolinium and lutetium, and a, b and c are numbers meeting the conditions $0.0005 \leqq a \leqq 0.09$, $0 \leqq b \leqq 0.01$ and $0.65 \leqq c \leqq 0.95$, respectively. In the formulae, it is preferred that the value of b meets the condition $0 < b \leqq 0.01$.

The UV-blue emitting phosphors emit radiation having more than about 80% of their spectral emission below 450 nm and their maximum emission in the wavelength range of 300–400 nm. UV-blue emitting phosphors which may be used in the intensifying screen of the present invention include UV-blue emitting phosphors known in the art such as lead or lanthanum activated barium sulfate phosphors, barium fluorohalide phosphors, lead activated barium silicate phosphors, gadolinium activated yttrium oxide phosphors, barium fluoride phosphors, alkali metal activated rare earth niobate or tantalate phosphors etc. UV-blue emitting phosphors are described for example in BE 703,998 and 757,815, in EP 202,875 and by Buchanan et al., J. Applied Physics, vol. 9, 4342–4347, 1968, and by Clapp and Ginther, J. of the Optical Soc. of America, vol. 37, 355–362, 1947. Particularly suitable UV-blue emitting phosphors for use in the intensifying screen of the present invention are those represented by the following general formula:

$$(Y_{1-2/3x-1/3y}, Sr_x, Li_y)TaO_4$$

wherein x and y are numbers meeting the conditions $10^{-5} \leqq x \leqq 1$ and $10^{-4} \leqq y \leqq 0.1$ as described in EP 202,875.

References to other well known kind of light emitting phosphors can be found in Research Disclosure, Vol. 184, August 1979, Item 18431, Section IX.

The binder employed in the fluorescent layer of the intensifying screen of the present invention, can be, for example, binders commonly used in forming layers: gum arabic, protein such as gelatin, polysaccharides such as dextran, organic polymer binders such as polyvinylbutyral, polyvinylacetate, nitrocellulose, ethylcellulose, vinylidene-chloride-vinylchloride copolymer, acrylates such as polymethylmethacrylate, and polybutylmethacrylate, vinylchloride-vinylacetate copolymer, polyurethanes, cellulose acetate butyrate, polyvinyl alcohol, and the like.

Generally, the binder is used in an amount of 0.01 to 1 part by weight per one part by weight of the phosphor. However, from the viewpoint of the sensitivity and the sharpness of the screen, the amount of the binder should preferably be minimized. Accordingly, in consideration of both the sensitivity and the sharpness of the screen and the ease of application of the coating dispersion, the binder is preferably used in an amount of 0.03 to 0.2 parts by weight per one part by weight of the phosphor. The thickness of the fluorescent layer is generally within the range of 10 μm to 1 mm.

In the intensifying screen of the present invention, the fluorescent layer is generally coated on a substrate. As the substrate, various materials such as polymeric material, glass, wool, cotton, paper, metal, or the like can be used. From the viewpoint of handling the screen, the substrate should preferably be processed into a sheet or a roll having flexibility. In this connection, the substrate is preferably a plastic film (such as a cellulose triacetate film, polyester film, polyethylene terephthalate film, polyamide film, polycarbonate film, and the like), ordinary paper, or processed paper (such as a photographic paper, baryta paper, resin-coated paper, pigment-containing paper which contains a pigment such as titanium dioxide, or the like). The substrate may have a primer layer on one surface thereof (e.g., the surface on which the fluorescent layer is provided) for holding the fluorescent layer tightly. As the material of the primer layer, an ordinary adhesive or primer can be used. In providing a fluorescent layer on the substrate (or on the primer layer or on the reflective layer), a coating dispersion comprising the phosphor dispersed in a binder may be directly applied to the substrate (or to the primer layer or to the reflective layer).

Between the phosphor layer and the substrate can be interposed a reflective layer to increase the amount of radiation emitted by the screen. The reflective layer may be composed of any reflective agent or pigment dispersed in a suitable binder. Pigments such as $TiO_2$, $ZrO_2$, MgO, ZnO, $Al_2O_3$, $PbCO_3$, $MgCO_3$, $PbSO_4$, calcium titanate, potassium titanate are already known and widely used. The reflective layer can comprises any binder, such as gelatin, gelatin derivatives, polyurethane, polyvinylacetate, polyvinylalcohol and the like. To improve the reflecting power of the substrate, the base support may be metallized by coating a thin layer of a reflective metal, such as, for example, aluminum. The thickness of the reflective layer is generally greater than 10 μm, preferably in the range of from 15 to 40 μm.

In the intensifying screen of the present invention, a protective layer for physically and chemically protecting the fluorescent layer is generally provided on the surface of the fluorescent layer intended for exposure (on the side opposite the substrate). When the fluorescent layer is self-supporting, the protective layer may be provided on both surfaces of the fluorescent layer. The protective layer may be provided on the fluorescent layer by directly applying thereto a coating dispersion to form the protective layer thereon, or may be provided thereon by laminating or adhering thereto the protective layer formed beforehand. As the material of the protective layer, a conventional polymeric material for a protective layer such a nitrocellulose, ethylcellulose, cellulose acetate, polyester, polyethyleneterephthalate, and the like can be used.

The intensifying screen of the present invention may be colored with a dye. Also, the fluorescent layer may contain a white powder dispersed therein. By using a dye or a white powder in the fluorescent layer, an intensifying screen which provides an image of high sharpness can be obtained.

The invention will be described hereinafter by reference to the following examples, which by no means are intended to restrict the scope of the claimed invention.

EXAMPLE 1

A set of radiographic screens was prepared by coating a dispersion of a green emitting $Gd_2O_2S$:Tb phosphor manufactured by Nichia Kagaku Kogyo K. K. under the trade name NP-3010-33M with an average particle grain size of 6.5 μm in a hydrophobic polymer binder solution, on a polyester support having a thickness of 250 μm. The composition of the dispersion was:

| | |
|---|---|
| $Gd_2O_2S$:Tb | 1000 g |
| methylacrylate-ethylacrylate copolymer | 63 g |
| vinylchloride-vinylpropionate copolymer | 62 g |
| acetone | 69 g |
| ethyl acetate | 157 g |
| methyl isobutyl ketone | 25 g |

The resulting fluorescent layer had a phosphor coverage of about 433 g/m$^2$ and a dry thickness of 110 pm. Between the phosphor layer and the support a reflective layer of $TiO_2$ particles in a polyurethane binder was coated at a thickness of 25 μm. The screens were overcoated with a cellulose triacetate and polyvinylacetate protective layer of 5 μm at a coating weight of about 5 to 6 g/m$^2$. After coating, the screens were dried overnight in an oven at 40° C.

During the coating, different amounts of $LiN(SO_2CF_3)_2$ or $LiC(SO_2CF_3)_3$ were added to the fluorescent layer and/or to the protective layer according to the following Table 1.

TABLE 1

| | Concentration of compound | | | | |
|---|---|---|---|---|---|
| | Into Dry Fluorescent Layer | | Into Dry Protective Layer | | Fluorescent + |
| Sample | % by volume | g/m$^2$ | % by volume | g/m$^2$ | Protective g/m$^2$ |
| | | | Reference Screen | | |
| R1 | — | — | — | — | — |
| | | | $LiN(SO_2CF_3)_2$ | | |
| N1 | 0.23 | 0.24 | — | — | 0.24 |
| N2 | 0.45 | 0.48 | — | — | 0.48 |
| N3 | 0.90 | 0.96 | — | — | 0.96 |
| N4 | 0.23 | 0.24 | 27 | 1.35 | 1.59 |
| N5 | — | — | 35 | 1.77 | 1.77 |
| N6 | — | — | 36 | 1.79 | 1.79 |
| N7 | 0.45 | 0.48 | 36 | 1.78 | 2.26 |
| N8 | 0.90 | 0.96 | 43 | 2.12 | 3.08 |
| | | | $LiC(SO_2CF_3)_3$ | | |
| L1 | 0.23 | 0.24 | — | — | 0.24 |
| L2 | 0.90 | 0.96 | — | — | 0.96 |
| L3 | 0.23 | 0.24 | 27 | 1.4 | 1.59 |
| L4 | — | — | 48 | 2.4 | 2.40 |
| L5 | 0.90 | 0.96 | 43 | 2.1 | 3.08 |

All the samples were then evaluated according to the following tests.

CHARGE DECAY TIME TEST

According to this test the static charge dissipation of each of the screens was measured. The screens were conditioned at 25% relative humidity and T=21° C. for 15 hours. The charge decay time was measured with a Charge Decay Test Unit JCI 155 (manufactured by John Chubb Ltd., London). This apparatus deposits a charge on the surface of the screen by a high volt orona discharge and a fieldmeter allows observation of the decay time of the surface voltage. The lower the time, the better the antistatic properties of the screen. To prevent the charge decay behavior of the tested surface from being influenced by the opposite surface, the opposite surface was grounded by contacting it with a metallic back surface.

SURFACE RESISTIVITY TEST

The surface resistivity of the sample screen surface was measured according to ASTM D257 with a Hewlett Packard model 16008A resistivity cell connected with a Hewlett Packard model 4329A high resistance meter. The lower the value, the better the antistatic protection of the screen.

SLIPPERINESS TEST

This test was performed with a Lhomargy apparatus. It consists of a slide moving on a film supported by the screen to be tested at a speed of about 15 cm/min. A force transducer connected to the slide transforms the applied force into an amplified DC voltage which is recorded on a paper recorder. The force applied to start the sliding movement represents the value of static slipperiness. The movement of the slide is not continuous. The discontinuity of the movement can be measured (in terms of slipperiness difference) from the graph of the paper recorder. This value represents the dynamic slipperiness. It was noted that the more the movement was discontinuous (i.e., the higher the value of slipperiness difference), the better was the performance of the screen. The test was performed with a 3M Trimax™ XD/A Plus radiographic film.

The results of the above mentioned tests are summarized in the following Table 2.

TABLE 2

| | | | Slipperiness Test | | | |
|---|---|---|---|---|---|---|
| | | | 50% Rel. Humidity | | 85% Rel. Humidity | |
| Sample | Decay Time | Surface Resistivity | Static | Dynamic | Static | Dynamic |
| | | | Reference Screen | | | |
| R1 | 1200 | $1*10^{15}$ | 0.49 | 0.32 | 0.44 | 0.30 |
| | | | $LiN(SO_2CF_3)_2$ | | | |
| N1 | 342 | $2.1*10^{13}$ | — | — | — | — |
| N2 | 48 | $3.9*10^{12}$ | — | — | — | — |
| N3 | 40 | $1.3*10^{12}$ | — | — | — | — |
| N4 | 4 | $2.4*10^{11}$ | 0.42 | 0.34 | 0.35 | 0.33 |
| N5 | 22 | $2.1*10^{12}$ | 0.43 | 0.28 | 0.32 | 0.30 |
| N6 | <1 | $9.6*10^{10}$ | 0.40 | 0.28 | 0.38 | 0.28 |
| N7 | <1 | $5.8*10^{10}$ | 0.40 | 0.29 | 0.49 | 0.34 |
| N8 | <1 | $1.3*10^{10}$ | 0.44 | 0.30 | 0.42 | 0.33 |
| | | | $LiC(SO_2CF_3)_3$ | | | |
| L1 | 280 | $3.0*10^{13}$ | — | — | — | — |
| L2 | 93 | $2.0*10^{12}$ | — | — | — | — |
| L3 | 36 | $4.0*10^{11}$ | 0.37 | 0.25 | 0.32 | 0.27 |
| L4 | 47 | $4.0*10^{12}$ | 0.43 | 0.32 | 0.40 | 0.32 |
| L5 | <1 | $3.0*10^{10}$ | 0.45 | 0.32 | 0.43 | 0.30 |

The data of Table 2 clearly show that the addition of the lithium salts in the intensifying screens of the present invention improves the antistatic characteristics without adversely affecting the slipperiness characteristics of the film/screen system.

EXAMPLE 2

The screen efficiency was measured by comparing the difference in speed of a radiographic film exposed with a control screen (R1 of example 1) and the screens of the invention (L5 and N7 of example 1). Two different films, 3M Trimax™ XD/A Plus and 3M R2 were employed.

The results are summarized in the following Table 3. Negative values mean less screen efficiency with respect the control screen R1.

TABLE 3

| Film | 3M Trimax ™ XD/A Plus | | 3M R2 | |
|---|---|---|---|---|
| Screen | L5 | N7 | L5 | N7 |
| DSpeed | 0 | 0 | −0.015 | 0 |

The data of Table 3 clearly show that the lithium salts do not adversely affect the light efficiency of the screens of the present invention.

We claim:

1. An X-ray intensifying screen comprising a support, a fluorescent layer coated thereon which comprises fluorescent phosphor particles dispersed in a binder, and a protective top-coat layer covering said fluorescent layer, wherein at least one of said fluorescent and top-coat layers comprises at least one salt selected from the group consisting of fluoroalkylsulfonyl methides, fluoroalkylsulfonyl imides, and fluoroalkylsulfonyl amides, wherein said salts are represented by the following formula:

$$[Rf-SO_2]_{v-m-1}X^-[Y-R]_m \quad Me^+$$

wherein Me is an organic or inorganic cation, Rf is a highly fluorinated alkyl group having 1 to 12 carbon atoms, X is nitrogen or carbon atom, Y is —C(O)—, —$SO_2$— or a single bond, R is an alkyl or aryl group, v is the valence of X, and m is 0 or 1, when X is nitrogen atom, and m is 0 or 1 or 2 when X is carbon atom, and wherein two Rf groups can join together to form a fluorinated cyclic alkyl ring.

2. The X-ray intensifying screen according to claim 1, wherein said salts are selected from the group of alkali and alkaline-earth metal salts of fluoroalkylsulfonyl imides and of fluoroalkylsulfonyl methides.

3. The X-ray intensifying screen according to claim 2, wherein said salts are lithium salts represented by the following formula:

$$[Rf-SO_2]_{v-1}X^- \quad Li^+$$

wherein Rf is a highly fluorinated alkyl group having 1 to 8 carbon atoms, X is nitrogen or carbon atom, and v is the valence of X, and wherein two Rf groups can join together to form a fluorinated cyclic alkyl ring.

4. The X-ray intensifying screen according to claim 3, wherein said lithium salts are added at a coating weight of from 0.01 to 20 $g/m^2$.

5. The X-ray intensifying screen according to claim 3, wherein said lithium salts are added at a coating weight of from 0.1 to 10 $g/m^2$.

6. The X-ray intensifying screen according to claim 3, wherein said lithium salts are added at a coating weight of from 1 to 5 $g/m^2$.

7. The X-ray intensifying screen according to claim 1, wherein said salts are added to both said fluorescent and top-coat layers.

8. The X-ray intensifying screen according to claim 7, wherein the salt coating weight ratio between said fluorescent and top-coat layers is from 1:1 to 1:10.

* * * * *